United States Patent [19]

Humbs et al.

[11] 4,005,264
[45] Jan. 25, 1977

[54] ARRANGEMENT FOR SCANNING A DISC-SHAPED TYPE CARRIER

[75] Inventors: Rolf Humbs; Robert Weinke, both of Munich, Germany

[73] Assignee: Siemens Aktiengesellschaft, Berlin & Munich, Germany

[22] Filed: July 8, 1975

[21] Appl. No.: 594,044

[30] Foreign Application Priority Data

Sept. 6, 1974 Germany .......................... 2442688

[52] U.S. Cl. ............................... 178/34; 101/93.19
[51] Int. Cl.² .................. H04L 15/34; G06K 15/06
[58] Field of Search .................. 178/28, 32, 34, 35, 178/38, 53, 53.1 R, 69.5 R; 101/93.18, 93.19

[56] References Cited

UNITED STATES PATENTS

| | | | |
|---|---|---|---|
| 3,399,753 | 9/1968 | Revelle | 178/34 |
| 3,651,916 | 3/1972 | Becchi | 101/93.19 |
| 3,701,104 | 10/1972 | Wiseman | 101/93.19 |
| 3,816,656 | 6/1974 | Ludwig | 178/34 |
| 3,823,265 | 7/1974 | Ludwig et al. | 178/34 |

*Primary Examiner*—Thomas A. Robinson
*Attorney, Agent, or Firm*—Hill, Gross, Simpson, Van Santen, Steadman, Chiara & Simpson

[57] ABSTRACT

An arrangement for scanning a disc-shaped type carrier in a code controlled printing device has a stepping motor which is controllable in the forward and backward directions for setting the type carrier. The count of a ring counter contained in the stepping motor control, and which is set in accordance with the setting of the stepping motor, is compared, as a binary combination, in a comparator device with a binary combination assigned to a specific character, and in the event of parity of the two binary combinations, an output pulse is emitted. A scanning sector is arranged on the type carrier and extends over a plurality of characters including the specific character, preferably centrally located along the scanning sector. A scanning device produces a scanning pulse in response to rotation of the sector to or past the scanning device and the scanning pulse is conjunctively linked with the output pulse of the comparator for utilization in system synchronization.

5 Claims, 3 Drawing Figures

| | 0° | 30° | 60° | 90° | 120° | 150° | 180° |
|---|---|---|---|---|---|---|---|
| A | 1 | 1 | 0 | 0 | 0 | 1 | 1 |
| B | 0 | 1 | 1 | 1 | 0 | 0 | 0 |
| C | 0 | 0 | 0 | 1 | 1 | 1 | 0 |

"E"

ARRANGEMENT FOR SCANNING A DISC-SHAPED TYPE CARRIER

BACKGROUND OF THE INVENTION

1. Field of the Invention

This invention relates to arrangement for scanning a disc-shaped type carrier in a code-controlled printing device having a stepping motor which may be controlled in the forward and backward directions and which serves to set the type carrier.

2. Description of the Prior Art

A teleprinter is known which has a disc-shaped type carrier, the type carrier being set via a stepping motor which is controllable in the forward and backward directions. Rotation of the type carrier to the particular position to which the type carrier is to be set is always effected over the shortest path in dependence upon the last position occupied by the type carrier. For this purpose, an n-position electronic binary counter is provided which can be controlled by way of a series of stepping marks arranged on the periphery of the type carrier, or on the periphery of a pulse train disc, and the setting of the counter is compared, in each case, electronically with that of the code combination assigned to the type which is to be set. Such a system is disclosed by Martin Ludwig in his U.S. Pat. No. 3,816,656, granted June 11, 1974 and assigned to the same assignee as the present invention. By this reference, the disclosure of this patent is fully incorporated herein.

However, in such an arrangement very high requirements are imposed on the synchronization between the type carrier and the binary counter. To ensure this synchronization, it is known to arrange, either on the type carrier or on the pulse train disc, an additional scanning mark which is scanned once per rotation. The pulse obtained in this manner then serves to reset and to synchronize the binary counter.

However, frequently it is insufficient to obtain a synchronization pulse only once per rotation. Therefore, it has already been described in the aforementioned Ludwig patent, to provide a synchronizing mark which occurs once on the type carrier periphery, or on the pulse train disc periphery, this mark being assigned to a specific character which occurs frequently in the text, preferably to the character E, and to synchronize the binary counter independently of the usual setting to the code signal assigned to this predetermined character. One thus obtains, via a scanning element which the mark passes with relative frequency, a very large number of synchronizing pulses. Therefore, the synchronization between the setting of the type carrier and the binary counter is practically always ensured.

The assignment of the scanning mark to a specific character does mean, however, that the scanning mark itself is only the same size as an element of the type carrier which bears the type characters. If, for example, 60 type elements are distributed over the periphery of the type carrier, only one sector of approximately 6° is available for the scanning mark. In order to safely recognize such a scanning mark, a high-resolution scanning device is required to recognize the scanning mark even when it moves past the scanning point at high speed. Such scanning devices are primarily in the form of expensive, elaborate opto-electronic scanning elements.

SUMMARY OF THE INVENTION

The primary object of the present invention is to provide an arrangement for scanning a disc-shaped type carrier in which a simple and sturdy scanning device can be used.

For this purpose, the invention is based upon the fact that the setting of the type carrier is effected by a stepping motor which has a plurality of windings and which is controlled with the aid of stepping pulses. The count of a ring counter provided in the stepping motor control in each case indicates a specific position of the stepping motor in the form of a binary combination. As the setting of the stepping motor in turn determines the peripheral setting of the type carrier, there is a relationship between the count of the ring counter in the stepping motor control and the setting of the type carrier.

Beginning from this basis, the realization of a synchronization mechanism, in accordance with the invention, consists in that the count of a ring counter, provided in the stepping motor control and set in a manner which is known per se, controls the setting of the type carrier via the stepping motor with a binary combination. The binary combination is compared in a comparator device with a binary combination assigned to a specific character, and in the event of favorable comparison of the two binary combinations, an output pulse is emitted. A scanning sector is provided on the type carrier and extends over a plurality of type elements, which plurality includes a specific character which is preferably centrally located with respect to the extent of the scanning sector. A scanning pulse is produced by scanning the scanning sector with a simple scanning device and is conjunctively linked with the output pulse of the comparator device.

The scanning sector on the type carrier is arranged in such a manner that even when a transmission gear is employed between the stepping motor and the type carrier, the binary combination of the specific character located in the region of the scanning sector is clearly defined.

Advantageously, the comparison is made with a binary combination which is assigned to a character frequently occurring in the text, for example to the character E.

It is also of advantage to arrange the scanning sector on the type carrier in such a manner that the specific character preferably the character E—lies in the middle of the scanning sector as mentioned above. As the scanning sector on the type carrier is considerably larger in its dimensions than in the previously known arrangement, the scanning device can itself be of a considerably simpler design. For example, high-resolution electro-optical scanning elements are not required. The comparison device required for the fine resolution also represents an electronically operating switching component of simple construction. The use of such components is not only of advantage from a production standpoint, but also offers a guarantee of long-term, interference-free operation.

BRIEF DESCRIPTION OF THE DRAWINGS

Other objects, features and advantages of the invention, its organization, construction and operation will be best understood from the following description taken in conjunction with the accompanying drawings, on which.

DESCRIPTION OF THE PREFERRED EMBODIMENT

Figure 1:
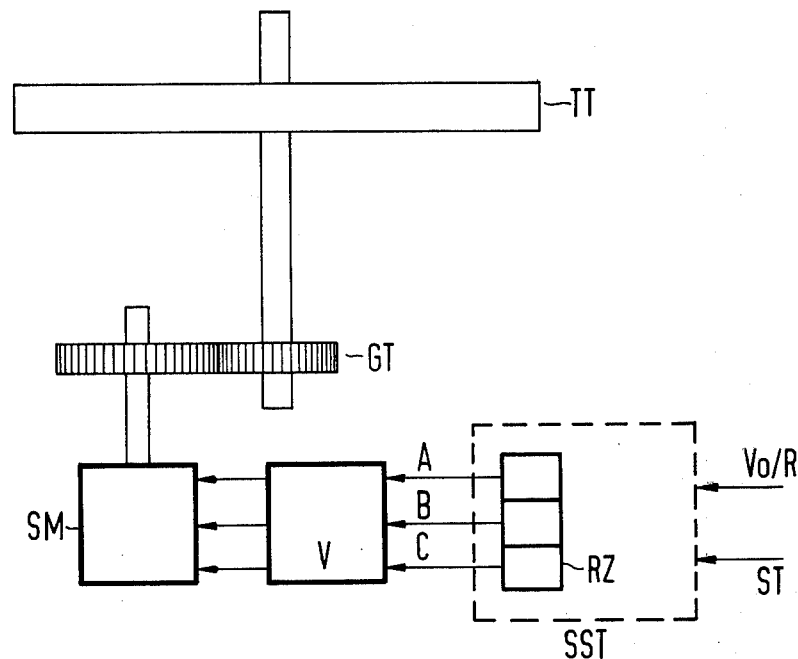
FIG. 1 is a schematic block diagram illustration of an arrangement for setting a type carrier with the aid of a stepping motor and constructed in accordance with the present invention.

Referring to FIG. 1, a disc-shaped type carrier TT is set by way of a gear GT by a stepping motor SM having three windings. The stepping motor SM is controlled with the aid of a stepping motor control SST of which only a ring counter RZ is illustrated herein. A stepping pulse train ST (FIG. 2) and a signal criterion for the forward and backward movement Vo and R is available at the input of the stepping motor control. This criterion can be produced, for example, in the manner described in the aforementioned Ludwig patent. The ring counter RZ is stepped in accordance with the stepping pulse train ST. The count of the ring counter RZ, in this example, represents the step setting of the stepping motor SM in the form of a three-digit binary combination ABC.

Figure 2:
FIG. 2 is a diagram which illustrates the relationship between the setting of the stepping motor and the individual pulses of the pulse train which controls motor advance, and the assignment between binary combinations and setting of the stepping motor.

From FIG. 2 it will be seen that with every stepping pulse of the pulse train ST the stepping motor SM is rotated by an angular setting of 30° which, taking into account the transmission gear GT, is, in each case, to signify a turn of the type carrier by one division. Each of these stepped settings corresponds to a specific binary combination ABC. The control of a stepping motor in accordance with these features is known per se and does not form the present invention. In this particular case it will be assumed—as will be explained in detail below—that the binary combination 101 is assigned to a setting of the stepping motor which corresponds to the print-out position of the character E on the type carrier.

Figure 3:
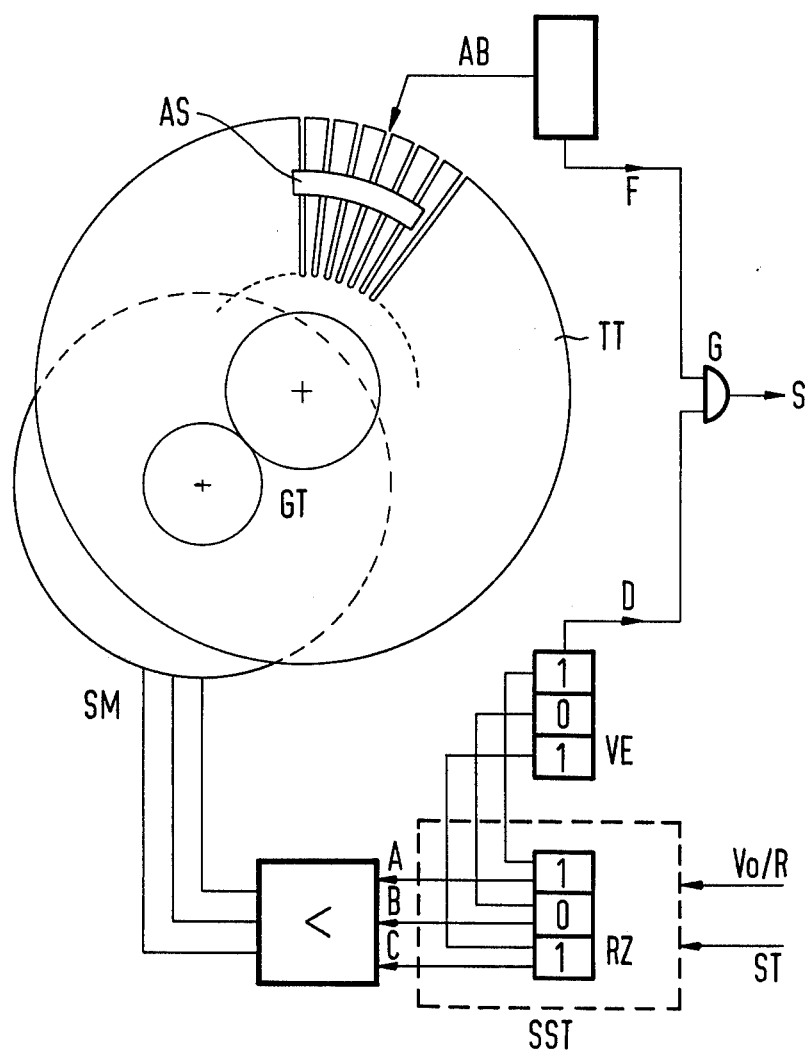
FIG. 3 is a schematic illustration of an exemplary embodiment of the invention.

The exemplary embodiment illustrated in FIG. 3 again shows the disc-shaped type carrier TT, the transmission gear GT and the stepping motor SM with the associated stepping motor control SST including the ring counter RZ. In accordance with the invention, a comparator device VE is provided which receives the count of the ring counter RZ in the stepping motor control SST.

A scanning sector AS is also arranged on the type carrier TT and extends over a plurality of type arms which bear the types or characters. A scanning element AB is provided for scanning the scanning sector AS. The output of the scanning element AB and the output of the comparator device VE are connected to an AND gate G at the output of which a signal S is available which is formed by the conjunctive linking of the output signals of the two devices.

The mode of operation of the arrangement set forth above, in accordance with the invention, is as follows:

The position of a specific character for print-out, or the passage of the specific character past the scanning point, causes a synchronizing pulse to be emitted. The character E has been established as the character occurring most frequently in the German language; other characters may, of course, be more prevalent in other languages and utilized accordingly. The binary combination, corresponding to this character, for the setting of the stepping motor SM is input in the comparator device VE. In this example, the binary combination will be assumed to be the combination 101. The scanning sector AS extends, however, over a plurality of type arms of the carrier, and the type arm bearing the character E lies in the middle of the scanning sector. When the ring counter RZ in the stepping motor control SST reaches the count corresponding to the setting of the character E—in this example of the count of 101—an output pulse D is available at the output of the comparator device VE. During a stationary period in the scanning sector AS, or during passage of the scanning sector relative the scanning device, and thus in the event of the positioning of the character E, or also in the event of passage through of the character E, an output pulse, namely a scanning pulse F, is likewise emitted by the scanning element AB. Both of the pulses D and F produce a synchronizing pulse S after conjunctive linking at the gate G.

Thus, in an arrangement constructed in accordance with the present invention, the scanning of the type carrier TT which is rapidly rotating, or which is stationary in the position E, can be carried out with a relatively inaccurately operating scanning device, whereas the fine scanning is carried out with an electronically constructed, and thus high-speed accurately operating component.

Within the region of the type disc covered by the scanning element AB, the character agreed upon as the comparison value, i.e. the bit combination assigned to this character, occurs only once. When a transmission gear is connected between the stepping motor and the type carrier it is possible that the binary combination may occur more than once. If, as is apparent from FIG. 2, the stepping motor is stepped in increments of 30°, the transmission gear causes an advance of the type carrier by one storage location with each 30° step (thus, with 60 characters, by 6°, respectively). If the scanning element were to extend over more than six characters, a bit combination would appear twice. On the basis of FIG. 2, it is apparent that, for example, at the position 0° and at the position 180°, the bit combination ABC = 100 occurs in each case and would cause an ambiguity. The solution offered here is that:

1. The scanning region is selected such that the agreed bit combination occurs only once; and
2. That this bit combination is located in the center of the scanning region.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In an arrangement for scanning a disc-shaped type carrier in a code controlled printing device having a stepping motor which is controllable in the forward and backward directions for setting the type carrier, the improvement comprising: a stepping motor control including a repetitively stepped ring counter for producing a sequence of binary combinations connected to the stepping motor and defining angular positions of the type carrier, a comparator connected to said ring counter for producing an output signal in response to receipt of a binary combination assigned to a specific character, a scanning sector on the type carrier extending over a plurality of type characters including the specific character, a scanning device for producing a scanning pulse in response to rotation of the scanning sector to a point in proximity to the scanning device and means for conjunctively linking the output pulse of the comparator and the scanning pulse to provide a synchronizing pulse.

2. The improved arrangement of claim 1 comprising a transmission gear connected between the stepping motor and the disc-shaped carrier, and wherein the scanning sector is arranged on the type carrier with the specific character located at a predetermined location in the range of the scanning sector.

3. The improved arrangement of claim 1, wherein the comparator device is set at a binary combination corresponding to a setting of the stepping motor which identifies a frequently occurring character in the language being printed.

4. The improved arrangement of claim 1, wherein this specific character is arranged adjacent a point corresponding to the middle of the scanning sector.

5. The improved arrangement of claim 1 wherein said means for conjunctively linking the output signal of said comparator device and the scanning pulse is an AND gate.

* * * * *